(12) United States Patent
Bruls et al.

(10) Patent No.: US 10,097,843 B2
(45) Date of Patent: Oct. 9, 2018

(54) EFFICIENT CODING OF DEPTH TRANSITIONS IN 3D (VIDEO)

(75) Inventors: Wilhelmus Hendrikus Alfonsus Bruls, Eindhoven (NL); Christiaan Varekamp, Eindhoven (NL); Reinier Bernardus Maria Klein Gunnewiek, Utrecht (NL)

(73) Assignee: KONINKLIJKE PHILIPS ELECTRONICS N.V., Eindhoven (NL)

( * ) Notice: Subject to any disclaimer, the term of this patent is extended or adjusted under 35 U.S.C. 154(b) by 282 days.

(21) Appl. No.: 13/508,739

(22) PCT Filed: Nov. 8, 2010

(86) PCT No.: PCT/IB2010/055054
§ 371 (c)(1),
(2), (4) Date: May 9, 2012

(87) PCT Pub. No.: WO2011/058492
PCT Pub. Date: May 19, 2011

(65) Prior Publication Data
US 2012/0229603 A1 Sep. 13, 2012

(30) Foreign Application Priority Data
Nov. 13, 2009 (EP) .................... 09175913

(51) Int. Cl.
*H04N 7/18* (2006.01)
*H04N 19/21* (2014.01)
(Continued)

(52) U.S. Cl.
CPC ........... *H04N 19/21* (2014.11); *H04N 13/161* (2018.05); *H04N 19/46* (2014.11); *H04N 19/597* (2014.11); *H04N 2213/003* (2013.01)

(58) Field of Classification Search
CPC . G06K 9/40; G06K 9/34; G06T 15/20; G06T 17/40; G06T 1/00; G06T 9/20; H04N 7/18; G09G 5/00
(Continued)

(56) References Cited

U.S. PATENT DOCUMENTS 5,812,787 A 9/1998 Astle
5,862,257 A * 1/1999 Sekine ............. G06T 1/00
358/3.01

(Continued)

FOREIGN PATENT DOCUMENTS

EP 1612732 A2 1/2006
EP 1612738 A2 1/2006
WO 2009001255 A1 12/2008

OTHER PUBLICATIONS

Ruzon, "Alpha Estimation in Natural Images", Jun. 2000.*
(Continued)

*Primary Examiner* — Gims S Philippe
*Assistant Examiner* — Albert Kir

(57) ABSTRACT

A method of encoding a video data signal (15) is provided, together with a method for decoding. The encoding comprises providing color information (51) for pixels in an image, providing a depth map with depth information (52) for the pixels, providing transition information (56, 57, 60, 70, 71) being representative of a width (63, 73) of a transition region (61, 72) in the image, the transition region (61, 72) comprising a depth transition (62) and blended pixels in which colors of a foreground object and a background object are blended, and generating (24) the video data signal (15) comprising encoded data representing the color information (51), the depth map (52) and the transition information (56, 57, 60, 70, 71). The decoding comprises using the transition information (56, 57, 60, 70, 71) for determining the width (63, 73) of the transition regions (61,
(Continued)

72) and for determining alpha values (53) for pixels inside the transition regions (61, 72). The determined alpha values (53) are used for determining the color of a blended pixel at the transition of a foreground object and a background object.

11 Claims, 5 Drawing Sheets

(51) Int. Cl.
  *H04N 19/597* (2014.01)
  *H04N 19/46* (2014.01)
  *H04N 13/161* (2018.01)
  *G06T 9/20* (2006.01)
(58) Field of Classification Search
  USPC ............ 345/420, 427, 646; 382/173, 260; 348/159, 43; 358/3.01; 375/240.12
  See application file for complete search history.

(56) References Cited

U.S. PATENT DOCUMENTS

| | | | |
|---|---|---|---|
| 5,917,937 A | 6/1999 | Szeliski | |
| 6,670,955 B1 | 12/2003 | Morein | |
| 6,809,730 B2 | 10/2004 | Howson | |
| 6,901,170 B1* | 5/2005 | Terada et al. | 382/260 |
| 7,221,366 B2 | 5/2007 | Uyttendaele | |
| 7,430,339 B2 | 9/2008 | Rother et al. | |
| 7,974,470 B2* | 7/2011 | Yoo et al. | 382/173 |
| 2003/0189568 A1 | 10/2003 | Alkouh | |
| 2006/0028489 A1* | 2/2006 | Uyttendaele | G06T 15/205 345/646 |
| 2006/0039611 A1 | 2/2006 | Rother et al. | |
| 2006/0171456 A1 | 8/2006 | Kwon | |
| 2006/0203904 A1 | 9/2006 | Lee | |
| 2008/0170783 A1 | 7/2008 | Yoo | |
| 2008/0240239 A1* | 10/2008 | Stuart | G06T 9/20 375/240.12 |
| 2008/0303815 A1* | 12/2008 | Noro | 345/420 |
| 2011/0199379 A1* | 8/2011 | Benien et al. | 345/427 |

OTHER PUBLICATIONS

G. Wolberg. "Digital Image Warping." IEEE Computer Society Press. 1990 p. 120,168.

W.H.A. Bails et. al. "Enabling introduction of stereoscaopic 3D video: compression standards, displays and content generation," in Proceedings of Int. Conference on Image Processing, pp. 89-92, 2007.

Samuel W. Hasinoff, et al. "Boundary Matting for View Synthesis" Computer Vision and Image Understanding, 103(1), pp. 22-32, 2006.

B. A. Barsky, et.al. "Elimination of artifacts due to occlusion and discretization problem in image space blurring techniques" Graphical Models 67(6): 584-599 (2005).

* cited by examiner

EFFICIENT CODING OF DEPTH TRANSITIONS IN 3D (VIDEO)

FIELD OF THE INVENTION

This invention relates to a method of encoding a video data signal, the method comprising providing color information for pixels in an image, providing a depth map with depth information for the pixels, providing transition information for blended pixels in which colors of a foreground object and a background object are blended and generating the video data signal comprising encoded data representing the color information, the depth information and the transition information.

This invention further relates to a method of decoding the video data signal, an encoder, a decoder, computer program products for encoding or decoding, the video data signal and a digital data carrier.

BACKGROUND OF THE INVENTION

In the emerging art of three-dimensional (3D) video, various methods exist for encoding a third dimension into the video data signal. A popular approach for representing 3D video is to use one or more two-dimensional (2D) images plus a depth representation providing information of the third dimension. This approach also allows 2D images to be generated with different viewpoints and viewing angles than the 2D images which are included in the 3D image data. Such an approach provides a number of advantages including allowing 3D views to be generated with relatively low complexity and providing an efficient data representation thereby reducing, e.g., storage and communication resource requirements for 3D video signals.

When generating images with different viewpoints, the different depths of different objects causes shifting of object boundaries rather than what should be done, generating new boundaries. The shifting of the object boundaries may cause undesired effects reducing the image quality. When, e.g., the light reflection from an out-of-focus foreground object is mixed with an in-focus background object unrealistic looking boundaries may appear. This problem is usually solved using an alpha map which is transmitted in a separate layer of the video data signal.

The alpha map comprises alpha values indicating for each pixel whether it is a foreground pixel, a background pixel or a mixed pixel in which the color is partly determined by the foreground object and partly by the background object. The alpha value reflects the mix ratio. Henceforth these mixed pixels are also referred to as 'uncertain' pixels. This mixing of colors is also called blending. For encoding purposes, the alpha values may be retrieved from existing data, manually assigned or estimated. An alpha estimation algorithm typically uses spatially nearby samples from the foreground and background to estimate a value for alpha for all pixels in the 'uncertain' region. To facilitate this estimation process, a so-called trimap is first produced, indicating for each pixel whether it is foreground, background or uncertain. Multiple spatially nearby samples are taken from the nearby foreground and background in order to estimate the foreground value, background value and alpha value for a pixel in the uncertain region. When generating a new view, the shifted foreground pixel value is blended with the new background.

Typically, an alpha map comprises relatively large areas with a value '1' for foreground pixels or '0' for background pixels. In between these areas, the alpha values make a quick transition from '0' to '1' or vice versa. This is, e.g., the case for object transitions where the foreground object is out-of-focus and for very thin objects such as hair, where it is convenient to use transparency as a mechanism for dealing with these objects. True transparency over larger regions such as windows, etc. does not occur very often in natural video. The spatially fast changes in alpha maps make them rather inefficient to compress and increases the transmission cost of the video data signal.

OBJECT OF THE INVENTION

It is an object of the invention to provide a method of encoding a video data signal as described in the opening paragraph, which method reduces the transmission cost while retaining smooth object transitions in the newly rendered views.

SUMMARY OF THE INVENTION

According to a first aspect of the invention, this object is achieved by providing a method of encoding a video data signal, the method comprising providing color information for pixels in an image, providing a depth map with depth information for the pixels, providing transition information being representative of a width of a transition region in the image, the transition region comprising a depth transition and blended pixels in which colors of a foreground object and a background object are blended, generating the video data signal comprising encoded data representing the color information, the depth map and the transition information.

Instead of having to provide alpha values for all pixels in a transition region, the method according to the invention only requires some information concerning the width of a transition region around a depth transition. As will be elucidated below, the information concerning the width of the transition region may be provided in many different forms. The main advantage of providing information concerning the width of the transition region is that it makes it unnecessary to provide exact alpha values for each 'uncertain' pixel. When the width of the transition region is known, the uncertain pixels are determined by creating a band of pixels around the position of the depth transition. Given the position of the uncertain pixels, alpha values may be produced in different ways.

First, the distance of an 'uncertain' pixel to the depth transition and the depth of the pixel itself (local foreground or local background) may be used to produce alpha values of the respective pixels. For example, a linear function may be used where alpha varies linearly over the uncertain pixels from 0 in the local background to 1 on the local foreground. Other, non-linear profiles are of course possible. Having alpha values alone could suffice for a crude (approximate) rendering of a new view by mixing the blended color with the background onto which the pixel is warped. Although not exact, visually this could be an acceptable way of dealing with the blurred regions.

Second, alpha may be generated using the known alpha estimation techniques where either two unknowns are estimated per pixel, namely: the foreground value and alpha (assuming there is already a background map in the data stream); or, three unknowns are estimated, namely: the foreground value, the background value and alpha. The depth values of the foreground and/or background objects forming the depth transition are thus preferably taken into account when determining the alpha values. These depth values are already available from the depth map.

The method according to the invention makes it possible to derive the usual alpha values from a much smaller amount of data. As a result transmission costs are reduced without having a detrimental effect on the image quality.

In an embodiment of this inventive method, the transition information comprises a width map. The width map defines the number of pixels comprised in a particular depth transition. Such a map only needs one integer value to define the width of the transition region. Compared to the alpha map used in the prior art, wherein for each pixel an alpha value is included, this method uses far less data for providing similar information. A practical case would for instance be to supply the width related data in the U-channel and or V-channel of a standard YUV 4:2:0 video where other information such as depth or a 'traditional' alpha channel is coded in the Y-channel.

The amount of data used in the width map can be further reduced by assigning width to blocks of data, thereby effectively downscaling the width map. As long as the distance between depth transitions is much larger than the block size, reconstruction of the high-resolution original is possible by assigning width values of the nearest block to a given depth transition. In a practical case this would imply that the DC value of the U and/or V channel will be used to store the width data, since the DC values are typically not susceptible to compression.

In an alternative embodiment, a binary map indicates for each pixel whether it is in the transition region or not. The width of the transition region may then easily be determined by counting the number of pixels in the transition region and an alpha value may be determined for each pixel in the transition region, using the width of the transition region and the position of the pixel. This binary map is similar to the known alpha maps, but it only uses a '1' or '0' for each pixel instead of an 8-bit alpha value. Although this embodiment with the binary map uses non-zero values for more pixels than the previous embodiment with the width map, the total amount of data is still low and may even be lower than in the previous embodiment.

The amount of data used for the binary map may even be further reduced by downscaling the binary map. The lower resolution binary map may then be used as a somewhat rough estimation of the transition region. For pixels in the transition region an estimation of the alpha values is made. However, the downscaled binary map is preferably used for reconstructing the original higher resolution binary map before the alpha values are determined.

Another embodiment does not use a width map, but a look-up table. The look-up table may comprise width parameters for different transition depths. The width of the transition region strongly depends on the distance between the depth transition and the plane of focus in the image. Close to the plane of focus, the transitions are sharp and the width of the transition region is small. Further away from the focal plane, the transition regions are wider. The transition depth may, e.g., be defined as the depth of the foreground or background object causing the transition depth. The transition depth may also be defined somewhere in between the depth values of the foreground and background object. The best results may be obtained when providing width parameters for specific pairs of depth values of the foreground and background objects. The transition depth is then defined as a combination of the depth values of both objects causing the depth transition.

In another embodiment rather than just the width, also the method for alpha map reconstruction (fixed curves, local estimation) can be specified in the lookup table. As mentioned before, multiple methods exist to generate alpha data. The preferred method could depend on the content (e.g. around hair versus around other objects), which could be signaled by having maps with three values coding the method of reconstruction as well as the location of the uncertain region instead of a binary map or merging these data with the width data. The width data can typically be represented with less than 8 bits, leaving a couple of bits to indicate the alpha reconstruction method. As such the width can be extracted using for example integer division (DIV operation) whereas the alpha reconstruction method can be obtained using the modulus operator (MOD).

It is to be noted that the transition information may contain the depth of the depth transition and some parameters of the camera set up used for capturing the video data. The inventors have realized that the width of the transition region can be determined from, e.g., the transition depth and the focal length and numerical aperture of the camera lens.

According to a further aspect of the invention, a method of decoding a video data signal is provided, the video data signal comprising encoded data representing color information for pixels in an image, a depth map with depth information for the pixels and transition information being representative of a width of a transition region comprising a depth transition and blended pixels in which colors of a foreground object and a background object are blended. The method of decoding comprises receiving the video data signal, determining the width of the transition region, determining alpha values of the blended pixels and determining a color of the blended pixels based on the alpha values and the color information. The determining of the width of the transition region is based on the transition information. The determining of the alpha values is based on the width of the transition region, the alpha value of the blended pixels being dependent on a distance to the depth transition.

In this decoding method, alpha values are generated from the transition information encoded with the video data signal. In a preferred decoding method, the alpha values also depend on the depth of the foreground object and/or the background object causing the depth transition. Taking into account parameters of the camera set up used for capturing the video data may improve the accuracy of the calculated alpha values and the resulting pixel colors.

These and other aspects of the invention are apparent from and will be elucidated with reference to the embodiments described hereinafter.

DETAILED DESCRIPTION OF THE INVENTION

Figure 1:
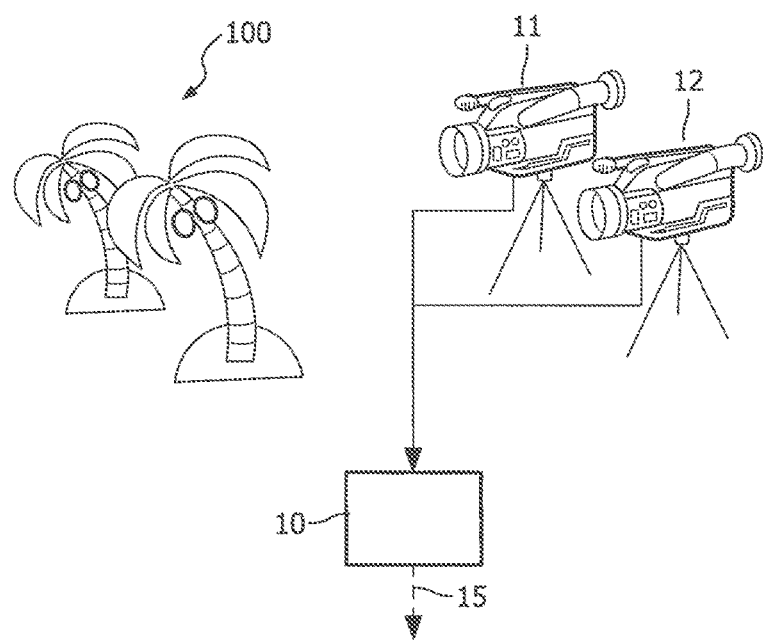
FIG. 1 shows a block diagram of a system for encoding video data according to the invention.

FIG. 1 shows a block diagram of a system for encoding video data according to the invention. The system comprises two digital video cameras 11, 12 and an encoder 10. The first camera 11 and the second camera 12 record the same scene 100, but from a slightly different position and thus also from a slightly different angle. The recorder digital video signals from both video cameras 11, 12 are sent to the encoder 10. The encoder may, e.g., be part of a dedicated encoding box, a video card in a computer or a software implemented function to be executed by a general purpose microprocessor. Alternatively, the video cameras 11, 12 are analog video cameras and the analog video signals are converted to digital video signals before they are provided as input for the encoder 10. If the video cameras are coupled to the encoder 10, the encoding may take place during the recording of the scene 100. It's also possible to record the scene 100 first and to provide the recorded video data to the encoder 10 later. It is to be noted that the method according to the invention concerns a special way of encoding a video data signal and is not limited to specific ways of acquiring the video data. For example, it is also possible to add depth information to video data acquired by one video camera only.

The encoder 10 receives the digital video data from the video cameras 11, 12, either directly or indirectly, and combines both digital video signals into one 3D video signal 15. It is to be noted that both video cameras 11, 12 may be combined in one 3D video camera. It's also possible to use more than two video cameras to capture the scene 100 from even more viewpoints.

In the following, the encoding and decoding methods according to the invention and the differences with the prior art methods will be explained using a single image. A 3D video signal may be seen as a sequence of many of such images. It is to be noted that part of the information used by the encoder 10 and decoder may be shared by multiple images. Some parameters may be specific for a particular image or scene (collection of sequential images). Other parameters may be useful for the complete video. A skilled person will recognize the possibilities to use the same parameters for different images in the video.

Figure 2:
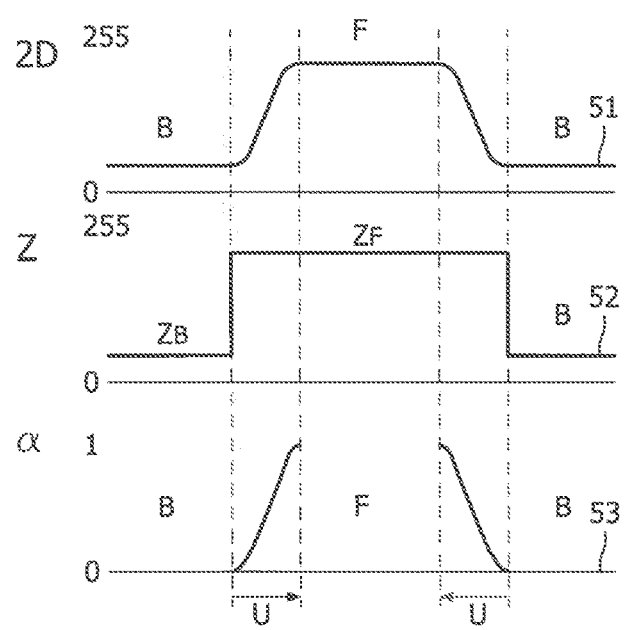
FIGS. 2 and 3 illustrate the mixing of colors in a transition region.

In prior art encoders, the generated 3D video signal may comprise a 2D image layer with color information 51 for pixels in the image, a depth map 52 with depth information for the pixels and an alpha map 53 with alpha values indicating how a foreground color and a background color should be mixed at a depth transition and close to the depth transition. The above described format is illustrated in FIG. 2, where the image is schematically depicted as one 2D image line 51 with a number of pixels. A gradual transition from the foreground value F ($\approx$220) to the background value B ($\approx$20) can be observed at the boundaries. The width of the transition areas is U. These areas are encapsulated by dashed lines. An associated depth map 52, indicated by Z, is shown below the image line 51. The transition areas have the same depth value, $Z_B$, as the foreground object. This is an arbitrary choice since the exact transition from the foreground to the background object is not well defined. The third picture in this Fig. depicts the alpha channel 53. In the alpha channel 53, a low value (here: close to 0) indicates the dominant contribution to corresponding pixel is from the background pixel whereas a high value (here: close to 1) indicates that the dominant contribution is from the foreground pixel. Outside of this transition area the alpha values are undefined. Prior art alpha maps 53 comprise the alpha value of each pixel in each transition area of the image 51.

Figure 3:
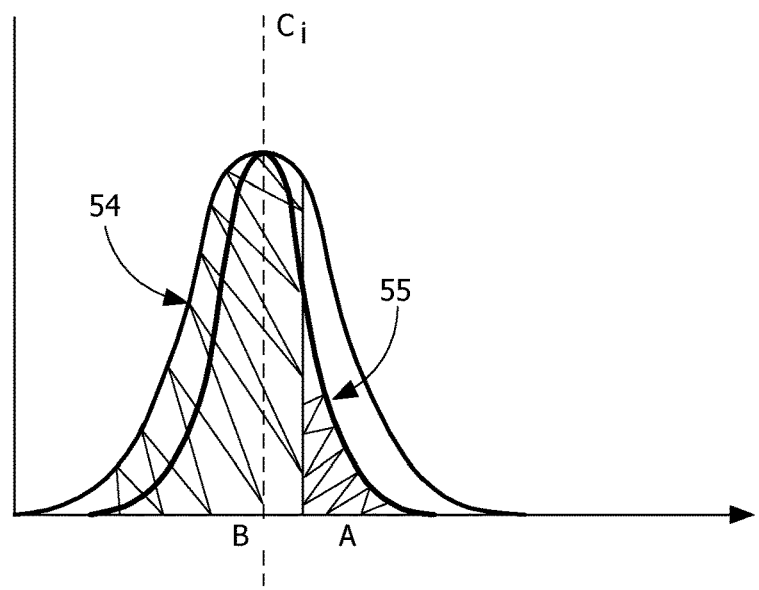

The blurring effect inherent to capturing images with a camera is illustrated in more detail in FIG. 3. A pixel at position $C_i$ receives multiple weighted contributions, i.e. one weighted sum from the surrounding background pixels, where the weights are reflected in the left hand marked part B of background Gaussian 54 and one weighted sum from the close by foreground pixels of which the weights are reflected in the right hand marked part A of foreground Gaussian 55. The shapes of the Gaussian curves depend on the camera settings (e.g. focal length, numerical aperture) and the distance of the object to the camera, also referred to as depth. Settings for the aperture and focus that were used during the capturing of a scene will determine the shape of the Gaussians and thus the width of the Gaussian curves. The effect is the presence of blended pixels near depth transitions.

It is important to note that from the decoded image data it is not possible to simulate the camera blurring process since the images are already blurred. This would only be possible if we would have computer graphics images that could be sharp everywhere. We could then simulate the effect of camera optics during the process. However, it is possible to account for the blurring process by selecting an appropriate width of the transition regions and let alpha change gradually from 0 to 1 in the transition region using either a linear or non-linear function.

Figure 4:
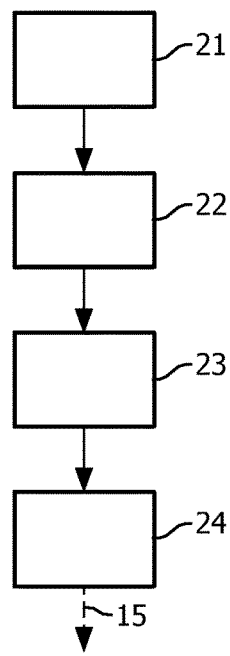
FIG. 4 shows a flow diagram of an encoding method according to the invention.

FIG. 4 shows a block diagram of an exemplary encoding method according to the invention. This encoding method may be performed by the encoder 10 of the system of FIG. 1. The encoding method uses the recorded digital video data from the cameras 11, 12 and provides a video data signal 15 according to the invention. In base image providing step 21, at least a first image of the scene is provided for inclusion in the video data signal 15. This base image may be standard 2D video data coming from one of the two cameras 11, 12. The encoder 10 may also use two base images; one from the first camera 11 and one from the second 12. From the base images, color values of all pixels in each frame of the recorded video can be derived. The base images represent the scene at a certain moment in time as seen from specific viewpoints. Additional images, showing the same image from a different viewpoint may be included.

In 3D enabling step 22, the incoming video data from the video cameras 11, 12 is used to add depth information to the base image. This added information enables a decoder to generate a rendered image of the same scene from a different viewpoint. The encoder uses known, preferably standardized, methods for deriving the depth information from the recorded regular video data. It is to be noted that the encoding method according to the invention may also be performed on 3D video data coming from an external source and already including depth information.

In transition information generating step 23, the encoder 10 generates information being representative of a width of a transition region in the image. This transition information may be provided in many different forms as already described above and as will be described below with reference to FIGS. 5 to 7.

In signal generating step 24, the information provided in the previous steps 21, 22, 23 is used for generating a video data signal 15 according to the invention. The video data signal 15 at least represents the 2D image, the depth information and the transition information. Additionally, the video data signal 15 may comprise parameters for enabling a decoder to derive the alpha values from the transition information with high accuracy. Such parameters may include, parameters describing the camera set up at the time the video data was captured, such as camera positions, lighting conditions or numerical aperture and focal length of the used cameras 11, 12.

Figure 5:
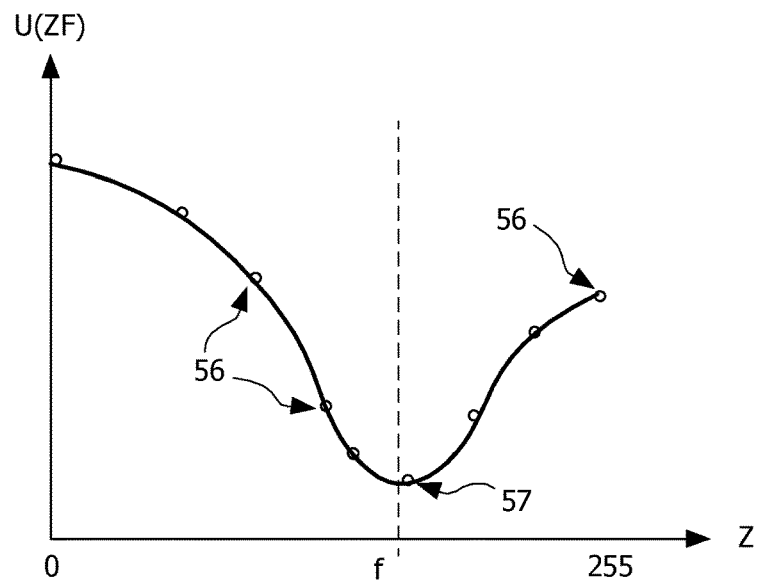
FIG. 5 shows a graphical representation of transition information that may be stored in a table.

FIG. 5 shows a graphical representation of transition information that may be stored in a table. According to the invention, a table may be provided in which width parameters 56, 57 (U(ZF)) can be found for different transition depths (Z). From such a table, a decoder 10 may find the width U(ZF) of a transition region at the border of a foreground object at a corresponding depth Z. The transition region at the border of an in-focus (f) foreground object will be narrow. The width parameter 57 corresponding to the depth of such an object is thus smaller than the width parameters 56 at other depths. The more out of focus, the wider the transition area. Instead of or in addition to the depth of the foreground object, the table may also use the depth of the background object. Alternatively, the table comprises width parameters for specific pairs of depth values for foreground and background objects overlapping each other in the image. The width parameters U(ZF) 56, 57 enable the decoder to determine the width of a transition region in the image. The width parameter U(ZF) 56, 57 may, e.g., be a number of pixels having a color contribution from both objects.

Figure 6:
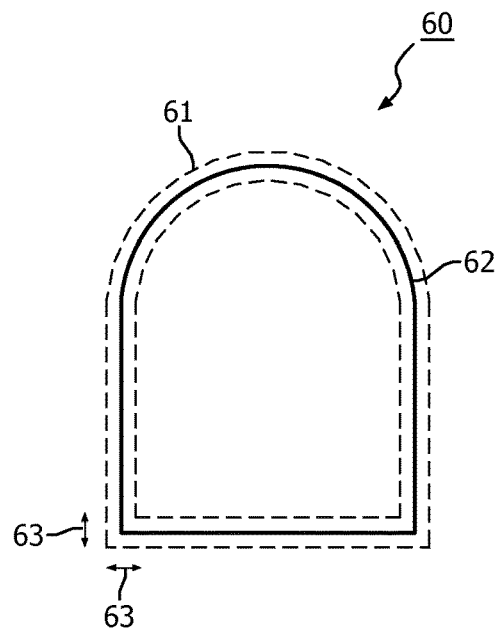
FIG. 6 shows an example of a width map according to the invention.

FIG. 6 shows an example of a part of a width map 60 according to the invention. Large parts of the width map 60 are empty. The width map 60 comprises a line 62 with width parameters at a position corresponding to a depth transition in the image. The transition region can be determined from the width parameters and is indicated by a dashed line 61. In an alpha map according to the prior art, all pixels in the transition region must have an alpha value. In the width map 62, only the pixels on the line 62 indicating the depth transition have a non-zero value. A decoder derives the width 63 of the transition region from this one value and uses it for generating the alpha values of the other pixels in the transition region.

In the exemplary situation shown in FIG. 6, the depth transition is at the center of the transition region. Alternatively, the depth transition may be at the border of a transition region and the width parameter indicates the number of pixels at the left/right/top/bottom side of the depth transition, which belong to the transition area. In a further embodiment, the depth transition may, by default, be at the border between the transition region and the foreground object or at the border of the transition region and the background object.

The amount of data used in the width map can be further reduced by assigning width to blocks of data, thereby effectively downscaling the width map. As long as the distance between depth transitions is much larger than the block size, reconstruction of the high-resolution original is possible by assigning width values of the nearest block to a given depth transition. In a practical case the DC value of the U and/or V channel in a standard YUV 4:2:0 video is used to store the width data, since the DC values are typically not susceptible to compression.

Figure 7A:
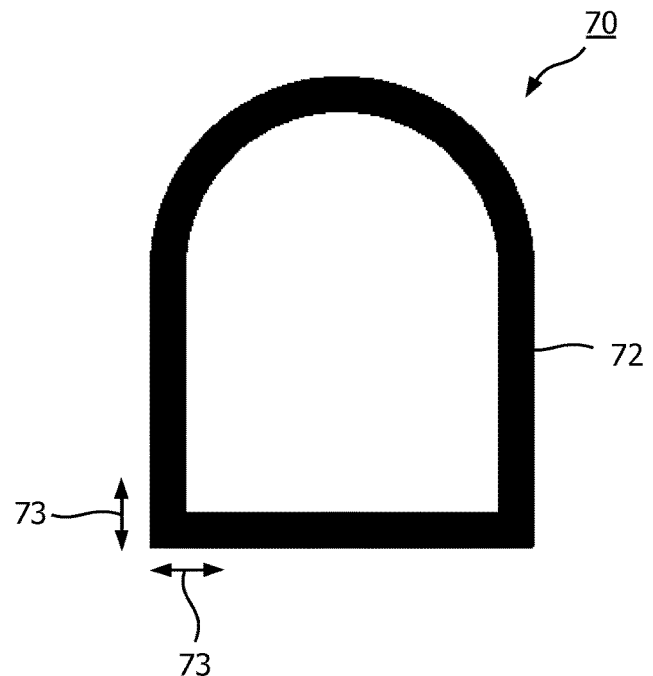
FIGS. 7a and 7b show examples of binary maps with transition information generated in accordance with the current invention.
Figure 7B:
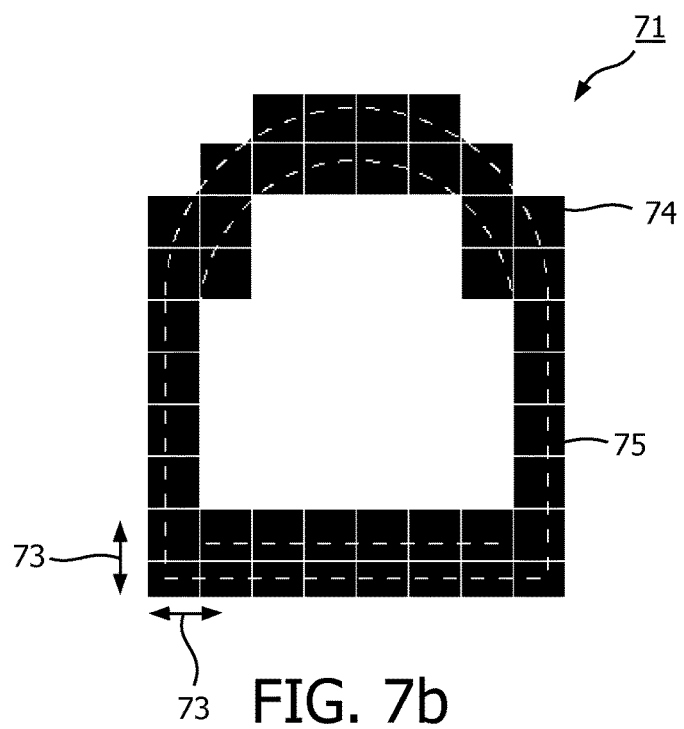

FIGS. 7*a* and 7*b* show examples of binary maps 70, 71 with transition information generated in accordance with the current invention. The binary map 71 in FIG. 7*b* is a down-scaled version of the binary map of FIG. 7*a*. The high resolution binary map 70 of FIG. 7*a* comprises a '1' for each pixel in the transition region 72 and a '0' for each pixel not in a transition region 72. A decoder can easily derive the width of the transition region 72 by counting the number of consecutive '1's. Using this width, alpha values can be calculated. This binary map 70 comprises an equal amount of data as the prior art alpha map. However, the width map 70 only uses a single bit per pixel, while the alpha map uses, e.g., an 8-bit value for coding the alpha values. The width map 70 according to the invention thus reduces the transmission costs.

In the down-scaled binary map 71, the image is divided into sections 74 of, e.g., 10 by 10 pixels. For each section 74, only one bit is needed for indicating whether the section comprises a depth transition or not. A decoder may treat complete sections 74 as transition region, but that will result in not so accurate alpha estimations and lower quality images. However, as can be seen from the dashed line 75 in FIG. 7*b*, the low resolution binary map 71 provides enough information for accurately reconstructing the transition region. After this reconstruction, the decoder can determine the alpha values with similar precision as when using the higher resolution binary map 70 of FIG. 7*a*.

Figure 8:
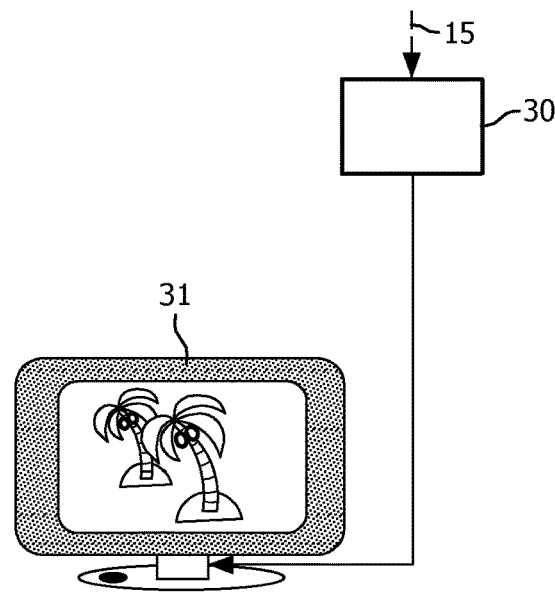
FIG. 8 shows a block diagram of a system for decoding video data according to the invention.

FIG. 8 shows a block diagram of a system for decoding video data according to the invention. The system comprises a decoder 30 for receiving the video data signal 15 and converting the video data signal 15 into a display signal which is suitable for being displayed by a display 31. The video data signal 15 may reach the decoder 30 as part of a broadcasted signal, e.g., via cable or satellite transmission. The video data signal 15 may also be provided on request, e.g., via the Internet or via a video-on-demand service. Alternatively, the video data signal 15 is provided on a digital data carrier, such as a DVD or Blu-ray disc.

The display 31 is capable of providing a 3D presentation of the scene 100 that was captured and encoded by the encoder 10 of the system of FIG. 1. The display 31 may comprise the decoder 30 or may be coupled to the decoder 30. For example, the decoder 30 may be part of a 3D video receiver which is to be coupled to one or more normal television or computer displays. Preferably, the display is a dedicated 3D display 31 capable of providing different views to different eyes of a viewer.

Figure 9:
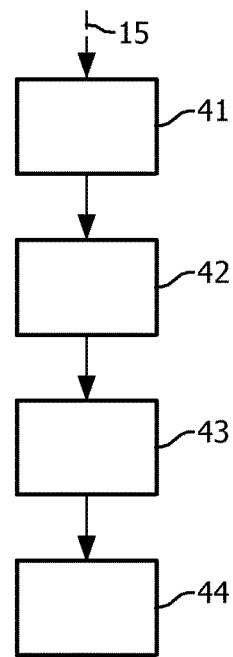
FIG. 9 shows a flow diagram of a decoding method according to the invention.

FIG. 9 shows a flow diagram of a decoding method as it may be performed by the decoder 30 of FIG. 8. In video data receiving step 41, the video data signal 15 encoded by the encoder 10 is received at an input of the decoder 30. The received video data signal 15 comprises encoded data representing an image, depth information and transition information as described above. The transition information may, e.g., be provided in the form of a table or width map. The encoded data may comprise additional information, such as camera set-up parameters.

In width determining step 42, the transition information is used for determining the width of the transition regions in the image. In alpha determining step 43, the determined width is used for calculating alpha values for pixels in the transition regions. The decoder may use more than just width information and depth information. For example, camera set-up parameters and depth information for the objects causing the depth transition could be helpful in determining alpha values. In pixel blending step 44, the alpha values and the color information of the image are combined to determine the color values of all pixels in the transition regions.

The methods, encoder and decoder devices according to the present invention are described in particular with reference to a method of encoding a video data signal, a method of decoding data signal, an encoder device and a decoder device. The invention may however also be applied within a method of transmitting a video data signal, the method comprising all steps of the encoding method as well as a further step of transmitting the encoded video signal. Conversely the invention may be applied in a method of receiving a video data signal, the method comprising all steps of the decoding method as well as a further step of receiving the encoded video data signal.

The video data signal may be transmitted and/or received over a wired or wireless channel, e.g. the video data signal may be transmitted over a IEEE1394 link, over an IP link. Likewise the video data signal may be transmitted over a wireless link in an in-home network; such as a wireless IEEE802.11 link or UWB link.

The present invention may also be embodied in a transmitter and/or a receiver for a video data signal. A transmitter in accordance with the invention comprises the encoder device according to the invention and further comprising transmission means for transmitting the encoded video data signal. Preferably the output of the encoder functions as the transmitting means. Conversely a receiver in accordance with the invention comprises the decoder device and further comprises receiver means for receiving the encoded video data signal; that is handling data arriving over the wired or wireless channel. Preferably the input of the decoder functions as the receiver means. As indicated hereinabove, the nature of the transmitting and receiving means is dependent on the type of channel used for exchanging the data.

Alternatively instead of transmitting and/or receiving the encoded video data signal over a channel, the encoded video data signal may also be stored and/or retrieved from a storage medium. In such embodiments, the respective methods comprise an additional step of storing the video data signal on and/or retrieving the video data signal from a storage medium or storage device.

The storage medium or storage device may be an optical storage medium, such as CD, CD-R, CD-RW, DVD, DVD+R, DVD-R, DVD+RW, DVD-RW, or Blu-ray disc. Likewise the encoded video data signal may be stored on a HDD or a solid state storage medium. The storage and/or retrieval device may in turn be part of a larger device such as a Personal Computer, a Personal Video Recorder, or a Blu-ray player.

When the present invention is incorporated in a device for storing a video data signal and/or retrieving a video data signal, the output for providing the video data signal preferably also incorporates means for storing the video data signal. Conversely the input for receiving the video data signal in such a case preferably includes means for retrieving the video data signal.

As will be clear to those skilled in the art the respective means vary with the storage medium or storage device involved.

A decoder and encoder in accordance with the present invention comprise means for processing, e.g. in case of the decoder, the decoder comprises means for determining the width of the transition region, means for determining the alpha values and means for determining a color. It will be clear to those skilled in the art that such processing means can be implemented on a wide range of processing platforms. Such platforms may consist of dedicated hardware, such as Application Specific Integrated Circuits, or FPGAs. However such processing may also be implemented in software for execution on a general purpose processing platform such as a general purpose processor or video signal processor, e.g. within a PC environment. Hybrid hardware software solutions are also envisaged. Although the is illustrated with regard to the means within a decoder according to the present invention, the same holds for the means within an encoder according to the present invention.

The present invention is described with reference to transparency values and transparency maps. However it will be clear to those skilled in the art that the present invention may be applied with equal effect to opacity values and opacity maps. Transparency and opacity are in this respect are substantially complementary; whereas one defines the extent to which an object is transparent, the other defines the extent to which an object is non-transparent.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method, comprising: receiving at an input of an encoder circuit a first input video data signal and a second input video data signal, wherein the first input video data signal is produced from a first camera and the second input video data signal is produced from a second camera, wherein the first camera and the second camera view a scene from two different angles;

the encoder circuit generating, from the first input video data signal and the second input video data signal, at least one base two-dimensional image of a scene, wherein the base two-dimensional image comprises color information for pixels in the base two-dimensional image;

the encoder circuit generating from the received first input video data signal and the second input video data signal, depth information for the base two-dimensional image;

the encoder circuit generating from the received first input video data signal and second input video data signal transition information, wherein the transition information is representative of a width of a transition region in the base two-dimensional image, the transition region comprising a depth transition and blended pixels, wherein the blended pixels comprise blended colors of a foreground object and a background, wherein the transition information comprises a width map wherein pixels in the base two-dimensional image along a line in the transition region each have an associated non-zero value in the width map, the non-zero value defining for the depth transition a corresponding width parameter indicating a number of blended pixels in the transition region, and all other pixels in the transition region have associated zero values in the width map;

the encoder circuit generating an encoded three-dimensional video data signal comprising encoded data representing the base two-dimensional image, the depth map, and the transition information; and the encoder circuit transmitting the encoded three-dimensional video data signal from an output of the encoder circuit.

2. A method, comprising: receiving at an input of an encoder circuit at least one input video data signal;

the encoder circuit generating from the at least one input video data signal at least one base two-dimensional image of a scene, wherein the base two-dimensional image comprises color information for pixels in the base two-dimensional image; the encoder circuit generating from the at least one input video data signal, depth information for the base two-dimensional image;

the encoder circuit generating from the at least one input video data signal transition information, wherein the transition information is representative of a width of a transition region in the base two-dimensional image, the transition region comprising a depth transition and blended pixels, wherein the blended pixels comprise blended colors of a foreground object and a background object, wherein the transition information comprises a binary map indicating with a single bit for each of a plurality of sections of one or more pixels in the base two-dimensional image whether the section comprises a transition region or not, and the encoder circuit generating an encoded three-dimensional video data signal comprising encoded data representing the base two-dimensional image, the binary map, and the transition information.

3. The method of claim 2, wherein the binary map has a lower resolution than the base two-dimensional image.

4. A method, comprising:

receiving at an input of an encoder circuit at least one input video data signal;

the encoder circuit generating from the at least one input video data signal at least one base two-dimensional image of a scene, wherein the base two-dimensional image comprises color information for pixels in the base two-dimensional image;

the encoder circuit generating from the at least one input video data signal, depth information for the base two-dimensional image;

the encoder circuit generating from the at least one input video data signal transition information, wherein the transition information is representative of a width of a transition region in the base two-dimensional image, wherein the transition region comprises a depth transition and blended pixels, wherein the blended pixels comprise blended colors of a foreground object and a background object, wherein the transition information comprises a table of width values, in units of pixels, for a corresponding plurality of different transition depths, and the encoder circuit generating an encoded three-dimensional video data signal comprising encoded data representing the base two-dimensional image, the depth map, and the transition information.

5. The method of claim 4, wherein the transition depths are defined as a depth of the foreground object at the depth transition.

6. The method of claim 4, wherein the transition depths are defined as a combination of the depths of the foreground object and the background object at the depth transition.

7. An encoder circuit, comprising:

an input configured to receive at least one input video data signal;

a processer circuit configured to:

generate from the at least one input video data signal at least one base two-dimensional image of a scene including color information for pixels in the base two-dimensional image;

generate from the at least one input video data signal depth information for the base two-dimensional image;

generate from the at least one input video data signal transition information, wherein the transition information is representative of a width of a transition region in the base two-dimensional image, wherein the transition region comprises a depth transition and blended pixels, wherein the blended pixels comprise blended colors of a foreground object and a background object, wherein the transition information comprises one of:

a width map wherein pixels in the base two-dimensional image along a line in the transition region each have an associated non-zero value in the width map, the non-zero value defining for the depth transition a corresponding width parameter indicating a number of blended pixels in the transition region, and all other pixels in the transition region have associated zero values in the width map, a binary map indicating with a single bit for each of a plurality of sections of one or more pixels in the base two-dimensional image whether the section comprises a transition region or not, and a table of width values, in units of pixels, for a corresponding plurality of different transition depths; and generate an encoded three-dimensional video data signal comprising encoded data representing the base two-dimensional image, the depth map, and the transition information; and an output configured to transmit the encoded three-dimensional video data signal.

8. A non-transitory computer medium for encoding a video data signal, which medium is operative to cause a processor circuit to perform the method as claimed in claim 1.

9. The method of claim 2, wherein each section comprises a plurality of pixels.

10. The method of claim 2, wherein each section comprises exactly one pixel.

11. The method of claim 1, wherein the encoded three-dimensional video signal further includes at least one parameter describing at least one of a lighting condition, a position, a numerical aperture, and a focal length setting for at least one of the first and second cameras at a time when it produced the corresponding first or second input video data signal.

* * * * *